Jan. 2, 1962 F. KINDL 3,015,491

SWITCHING ARRANGEMENT FOR DICTATION APPARATUS

Filed Jan. 16, 1958

INVENTOR
FRIEDRICH KINDL
BY Frank R. Jifani
AGENT

3,015,491
SWITCHING ARRANGEMENT FOR DICTATION APPARATUS

Friedrich Kindl, Vienna, Austria, assignor to North American Philips Company, Inc., New York, N.Y., a corporation of Delaware Filed Jan. 16, 1958, Ser. No. 709,407
Claims priority, application Austria Mar. 7, 1957
2 Claims. (Cl. 274—11)

The invention relates to a dictation apparatus, in which the driving mechanism for the record carrier is switched on and off by electrical means, for example relays, in the current circuits of which parallel-connected contact pairs for interrupting and closing the current circuit are included, one pair being operated by a foot switch, the other by a switch, preferably a manual switch.

With devices for recording and reproducing information, for example magnetic information it is efficient to choose the control-members to be such that unwanted erasing of a record is impeded as much as possible. With dictation apparatus it is essential to take such precautions. Particularly for the typist, who writes down on paper the text recorded on the carrier, it must be impossible to erase the record. However, these precautions should not involve complicated control-manipulations either for the dictating person or for the typist.

In order to move the record carrier or, as the case may be, the members scanning the record carrier, it is efficient to provide for the typist only a foot switch, whereas the dictating person usually prefers manual control (manual switch). With apparatus, with which the erasing of the recorded text by the typist should be avoided as far as possible, the driving mechanism of the apparatus, when using a foot switch, must remain out of operation as long as an erasing operation is going on, for example during recording.

It is known per se with control-members, for example the recording-reproducing switch, required for the control of recording and reproducing members, for example magnetically operated members, and capable of performing the change-over from recording to reproduction and conversely, and with the switch for switching on the carrier movement in the desired direction and with the desired speed, to take such measures that the control-members can be actuated only in a given order of succession or that given members are blocked as long as other members occupy particular switching positions.

In accordance with the invention the current circuit operated by the foot switch includes two additional contacts, which can be operated by means of the recording-reproducing switch of the dictation apparatus independently of the foot switch and which are opened during recording and closed during reproduction.

In an advantageous embodiment of the dictation apparatus according to the invention the (manual) switch for switching on the carrier movement required for recording and reproduction can be made detachable, in known manner, from the apparatus and the recording-reproducing switch occupies, in known manner, automatically the reproducing position, when a manual switch is operated to move the record carried back in order to repeat a recorded text.

The invention will now be described more fully with reference to one embodiment.

Figure 1:
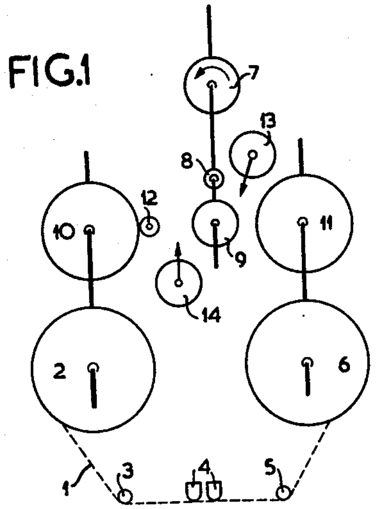
FIG. 1 shows diagrammatically the drive of a device for recording or reproducing magnetic information on a tape or wire-shaped record carrier.

In the embodiment shown in FIG. 1 a tape-shaped record carrier 1 travels from the supply reel 2 over a guide pin 3 along the magnet heads 4 and is wound up by a winding-up reel 6 after the tape has been bent along a guide pin 5. Since an accurately constant tape speed is not required, the transport roller, which is otherwise required, may be omitted. On the shaft of a driving motor 7 are seated two driving rollers 8 and 9, of which the roller 8 has a smaller diameter and the roller 9 a larger diameter. The shafts of the reels 2 and 6 are provided with driving rollers 10 and 11 respectively. When an intermediate roller 13 is slipped between the driving roller 8 and the driving roller 11, the tape travels forward with normal speed. The interposition of the intermediate roller 14 between the driving roller 9 and the intermediate roller 12 produces the high-speed return of the tape. The intermediate rollers 13 and 14 are subjected to spring pressure, which operates against the arrows indicated and which is to be overcome during the interposition. This may be achieved by means of the armatures of two magnets provided on the rollers and attracted during the passage of current through the magnets. These parts and further parts are not shown, since they and, indeed, the whole mechanical section, may be constructed in known manner.

Figure 2:
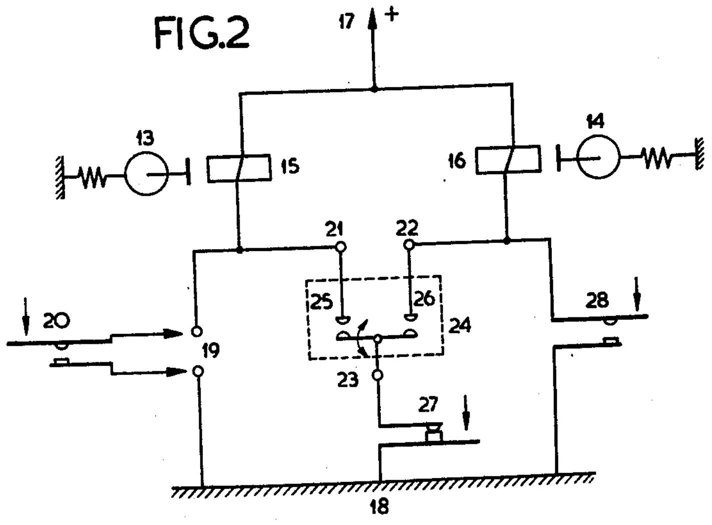
FIG. 2 shows a circuit diagram of the relay current circuits.

FIG. 2 shows an example of the magnets according to the invention. The magnet 15 actuates the intermediate roller 13 and thus switches on the normal movement for recording and reproduction; the magnet 16 actuates the intermediate roller 14 and thus switches on the return travel. The magnets, which are connected in parallel with the positive terminal 17 and the earth-connected negative terminal 18 of a current source, are energized by this source. The magnet 15 can obtain current through two parallel paths. One path passes via two sleeves 19 to earth. The two sleeves 19 serve to provide two detachable conductors, which lead to a switch 20, which is arranged in an efficaceous manner on the microphone housing and which can be detached together with the microphone from the apparatus. The other path of the current supply leads from the magnet 15 to a sleeve 21. This sleeve 21, together with two further sleeves 22 and 23, serves to connect a foot switch 24. The latter is constructed in the form of a balance having two pairs of contacts. By tilting the switch out of the central position, in which all contacts are open, either the pair of contacts 25 or the pair of contacts 26 are closed. However, the current can pass through these pairs of contacts only when a pair of contacts 27 between the sleeve 23 and earth 18 is closed. This pair of contacts 27 is switched on by the recording-reproduction switch in a manner such that it is opened during the change-over to recording.

The magnet 16 can also be energized via two parallel-connected current circuits. A pair of contacts 28 is connected in parallel with the branch passing via the sleeve 22, the pair of contacts 26, the sleeve 23 and the pair of contacts 27 to earth 18. The pair of contacts 28 is closed by a knob, by which the return travel of the tape can be initiated by hand (hand switch for return travel).

It is evident from the diagram that even when the foot switch is not provided, the normal movements can be obtained by the manual switch 20, both in the recording and in the reproduction positions of the apparatus, which is required for dictations. When the switch 20 is removed and the foot switch used instead, the normal movements can be obtained only in the reproduction position. Even the return travel of the tape can be obtained by the foot switch only in the reproduction position.

The manual switch 28 is used by the dictating person for the return travel of the tape, when a dictated text is to be reproduced. In order to avoid erasing of the recorded text when this switch 28 is operated, it is efficient to render the recording-reproduction switch dependent thereupon in a manner such that during each change-over of the return switch 28 the recording-reproduction switch is moved automatically into the reproduction position. For such a switch structure various solutions are known.

What is claimed is:

1. In dictation apparatus having a record carrier with driving mechanism therefor, and a recording phase and a reproduction phase, a first switch connected in series with said driving mechanism for energizing said driving mechanism to move said carrier for recording or reproduction of information, a second switch connected in parallel with said first switch and in series with said driving mechanism for energizing said driving mechanism to move said carrier for reproduction of information and a third switch arranged in series circuit arrangement with said second switch, said third switch being opened during the recording phase and closed during the reproduction phase to allow said driving mechanism to be energized by said second switch only during the reproduction phase of said apparatus.

2. In dictation apparatus having a record carrier with driving mechanism therefor and a recording phase and a reproduction phase, a first manually operated switch connected in series with said driving mechanism for energizing said driving mechanism to move said carrier for recording or reproduction of information, a foot-operated switch connected in parallel with said first switch and in series with said driving mechanism for energizing said driving mechanism to move said carrier for reproduction of information and to rewind said carrier, a second manually operated switch for energizing said driving mechanism to rewind said carrier, and a third switch connected in series with said foot-operated switch, said third switch being opened during the recording phase and closed during the reproduction phase for rendering said foot-operated switch inoperative for actuating the driving mechanism during the recording phase of the apparatus.

References Cited in the file of this patent

UNITED STATES PATENTS

| | | |
|---|---|---|
| 2,330,134 | Meincke | Sept. 21, 1943 |
| 2,572,596 | Camras | Oct. 23, 1951 |
| 2,612,565 | Heller | Sept. 30, 1952 |
| 2,813,686 | Schroter | Nov. 19, 1957 |